US011993377B2

(12) United States Patent
Andreani (10) Patent No.: US 11,993,377 B2
(45) Date of Patent: May 28, 2024

(54) SHUTTER ASSEMBLY AND SHUTTER ARRANGEMENT FOR COVERING A TRUNNION OPENING, AND HIGH-LIFT SYSTEM AND AIRCRAFT EQUIPPED THEREWITH

(71) Applicant: Airbus Operations GmbH, Hamburg (DE)

(72) Inventor: Luc Andreani, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 252 days.

(21) Appl. No.: 17/731,376

(22) Filed: Apr. 28, 2022

(65) Prior Publication Data

US 2022/0315202 A1    Oct. 6, 2022

Related U.S. Application Data

(63) Continuation of application No. PCT/EP2020/078872, filed on Oct. 14, 2020.

(30) Foreign Application Priority Data

Oct. 31, 2019   (DE) ............... 10 2019 129 414.2

(51) Int. Cl.
*B64C 9/02* (2006.01)
*B64C 1/26* (2006.01)
*B64C 13/28* (2006.01)

(52) U.S. Cl.
CPC ............ *B64C 9/02* (2013.01); *B64C 1/26* (2013.01); *B64C 13/28* (2013.01)

(58) Field of Classification Search
CPC ................................. B64C 1/26; B64C 9/02
See application file for complete search history.

(56) References Cited

U.S. PATENT DOCUMENTS

| 4,576,347 | A | * | 3/1986 | Opsahl | B64C 7/00 244/129.1 |
| 4,979,702 | A | * | 12/1990 | Franklin | A44B 19/26 244/129.4 |
| 9,623,957 | B2 | * | 4/2017 | Bleazard | B64C 9/16 |
| 10,604,231 | B2 | * | 3/2020 | Bond | B64C 9/16 |
| 10,793,252 | B2 | * | 10/2020 | Tsai | B64C 7/00 |

(Continued)

FOREIGN PATENT DOCUMENTS

| EP | 1 084 229 B1 | 1/1988 |
| EP | 2 990 330 A1 | 3/2016 |
| WO | WO 2018/138034 A1 | 8/2018 |

OTHER PUBLICATIONS

International Search Report and Written Opinion for Application No. PCT/EP2020/078872 dated Jan. 15, 2021.

*Primary Examiner* — Michael H Wang
(74) *Attorney, Agent, or Firm* — KDW Firm PLLC (57) ABSTRACT

For sealing at the transition between high-lift devices and fairings, a shutter assembly can be installed in a high-lift system, thereby forming the shutter arrangement. The shutter assembly includes the shutter panel and possibly the driving member. The shutter assembly can be installed in the high-lift system, to form any embodiment of the shutter arrangement. The shutter arrangement covers the trunnion opening and is moveable in correspondence with the movement of the high-lift device in a continuous and strictly monotone manner.

17 Claims, 5 Drawing Sheets

(56) References Cited

U.S. PATENT DOCUMENTS

| | | | |
|---|---|---|---|
| 10,981,644 B2* | 4/2021 | Gonze | F16J 15/025 |
| 2006/0145013 A1* | 7/2006 | Gomez | B64C 9/02 |
| | | | 244/130 |
| 2015/0069178 A1 | 3/2015 | Brown et al. | |
| 2017/0327204 A1* | 11/2017 | de Sousa | F16J 15/104 |
| 2019/0300146 A1* | 10/2019 | Tsai | B64C 7/00 |
| 2019/0300149 A1* | 10/2019 | Kordel | B64C 9/02 |

\* cited by examiner

SHUTTER ASSEMBLY AND SHUTTER ARRANGEMENT FOR COVERING A TRUNNION OPENING, AND HIGH-LIFT SYSTEM AND AIRCRAFT EQUIPPED THEREWITH

CROSS-REFERENCE TO RELATED APPLICATIONS

This application is a continuation of and claims priority to Patent Application No. PCT/EP2020/078872, filed Oct. 14, 2020, which claims priority to German Patent Application No. DE 10 2019 129 414.2 filed Oct. 31, 2019, the entire disclosures of which are herein incorporated by reference.

TECHNICAL FIELD

The disclosure herein relates to a shutter assembly configured to form a shutter arrangement that is suitable for covering a trunnion opening in a belly fairing of an aircraft. Furthermore, the disclosure herein relates to such a shutter arrangement, a high-lift system, and an aircraft.

BACKGROUND

WO 2018/138 034 A1 discloses an assembly for an aircraft comprising a fuselage portion, an adjacent movable trailing edge flap, and a seal system. The seal portions are arranged opposite one another.

US 2017/0 327 204 A1 discloses a variable angular compression seal for moveable aircraft components.

EP 0 184 229 B1 discloses a main flap torque tube slot seal.

US 2019/0 092 451 A1 discloses a fairing door assembly.

EP 2 990 330 B1 discloses a torque tube door.

SUMMARY

An object of the disclosure herein is to improve sealing at the transition between high-lift devices and fairings.

The object is achieved by the subject matter disclosed herein. Advantageous embodiments are disclosed herein.

The disclosure herein provides a shutter assembly configured to form a shutter arrangement that is suitable for covering a trunnion opening in a belly fairing of an aircraft, wherein the trunnion opening extends along a longitudinal direction and follows an annular path, wherein the trunnion opening is suitable for letting a trunnion shaft of a high-lift device pass through, the shutter assembly being configured to be installed adjacent to the trunnion opening, to be rotatable between a fully shut position, in which the shutter assembly covers the trunnion opening except for a trunnion passage arranged at one end portion of the trunnion opening for the trunnion shaft to pass through, and a fully open position, wherein the shutter assembly is configured to be installed such that the shutter assembly is movable between the fully shut and fully open positions in a continuous and/or strictly monotonous manner in correspondence with the movement of the trunnion shaft within the trunnion opening.

Preferably, the shutter assembly further comprises a shutter panel adapted to the contour and extension of the trunnion opening such that, when the shutter assembly is in the fully shut position, the shutter panel covers the trunnion opening along its longitudinal direction except for the trunnion passage.

Preferably, the shutter panel is configured to be installed such that the shutter panel is rotatable about a hinge axis, which is mainly parallel to the inboard-outboard direction of the aircraft.

Preferably, the shutter panel is configured to be installed such that the shutter panel is rotatable about a hinge axis, which is mainly parallel to the forward-aft direction of the aircraft and/or which is inclined from the horizontal direction by an angle.

Preferably, the shutter assembly further comprises a drive member configured to be installed such that the drive member is mechanically coupled to the high-lift device to transmit the movement of the high-lift device to the shutter panel thereby causing a continuous strictly monotone rotation of the shutter panel.

Preferably, the shutter panel comprises or consists of a first shutter and a second shutter that are both configured to be installed such that a movement of the trunnion shaft is able to split the shutter panel along its longitudinal direction and causing the first and second shutters to rotate about respective hinge axes in order to expose the trunnion opening in correspondence with the movement of the trunnion shaft within the trunnion opening.

Preferably, the shutter assembly further comprises an urging member configured to be installed such that the shutter assembly is urged towards the fully shut position.

The disclosure herein provides a shutter arrangement that is suitable for covering a trunnion opening in a belly fairing of an aircraft, the shutter arrangement comprising a portion of a belly fairing, a trunnion opening formed in the belly fairing, the trunnion opening extending along a longitudinal direction and following an annular path, wherein the trunnion opening is suitable for letting a trunnion shaft of a high-lift device pass through, and a preferred shutter assembly, the shutter assembly being arranged adjacent to the trunnion opening, to be rotatable between a fully shut position, in which the shutter assembly covers the trunnion opening except for a trunnion passage arranged at one end portion of the trunnion opening for the trunnion shaft to pass through, and a fully open position, wherein the shutter assembly is configured such that the shutter assembly is movable between the fully shut and fully open positions in a continuous and/or strictly monotonous manner in correspondence with the movement of the trunnion shaft within the trunnion opening.

Preferably, the shutter assembly comprises a shutter panel adapted to the contour and extension of the trunnion opening such that, when the shutter assembly is in the fully shut position, the shutter panel covers the trunnion opening along its longitudinal direction except for the trunnion passage.

Preferably, the shutter panel is mounted to be rotatable about a hinge axis, which is mainly parallel to the inboard-outboard direction of the aircraft.

Preferably, the shutter panel is mounted to be rotatable about a hinge axis, which is mainly parallel to the forward-aft direction of the aircraft and which is inclined from the horizontal direction by an angle.

Preferably, the shutter assembly comprises a drive member that is suitable to be mechanically coupled to the high-lift device and that is mechanically coupled to the shutter panel, to transmit the movement of the high-lift device to the shutter panel thereby causing a continuous strictly monotone rotation of the shutter panel.

Preferably, the shutter panel comprises or consists of a first shutter and a second shutter that are both mounted relative to the trunnion opening such that a movement of the trunnion shaft is able to split the shutter panel along its longitudinal direction and causing the first and second shutters to rotate about respective hinge axes in order to expose the trunnion opening in correspondence with the movement of the trunnion shaft within the trunnion opening.

The disclosure herein provides a high-lift system for an aircraft, the high-lift system comprising a high-lift device that is movable by a trunnion shaft between a retracted position and an extended position, in which additional lift is created, and a preferred shutter arrangement, wherein the trunnion shaft extends through a trunnion opening formed in the belly fairing.

The disclosure herein provides an aircraft comprising an installed preferred shutter assembly and/or a preferred shutter arrangement and/or a preferred high-lift system.

Basic ideas and advantages will now be described. It should be noted that not all advantageous effects of the disclosure herein must be present at the same time or with the same intensity.

The disclosure herein relates to a sealing mechanism preferably at the wing root at the trailing edge of a commercial aircraft between the inboard flap trunnion (I/B-flap-trunnion) and the belly fairing. The intersection between the I/B-flap-trunnion and the flap support usually has an appropriate sealing concept, which is reliable, robust, and jam free. The trunnion sealing is intended to reduce parasitic drag in cruise flight caused by the trunnion cut-out. This trunnion cut-out sealing also is able to avoid leakage flows, vibration issues and/or noise issues caused by the belly fairing structure.

The basic idea of the presented mechanism is to possibly avoid all kinds of issues like soft and hard jam cases, wearing, flow leakages during cruise (drag reduction), to increase the mechanisms reliability, and also to reduce the weight of the mechanisms.

There are several concepts for closing the trunnion cut-out mainly in cruise flight condition. All concepts use a simple hinge line on a shutter-panel to close the trunnion cut-out.

When using two panels for closing the trunnion cut-out, preferably also two hinge lines are used. In general, two panels are able to provide a better sealing in the take-off condition. While the take-off and landing sealing conditions are important, their importance is in general superseded due to huge areas of the main landing gear bay already being open and creating drag, vortices, noise, and the differential pressure. Thus, the focus of the disclosure herein is mainly on the sealing condition in cruise flight and a more reliable and robust solution.

For example, in "planar" shutter panel mechanisms with one hinge line and a driving strut is used. When the flap trunnion is opening the shutter panel with the connected drive strut. The mechanisms can be designed as "planar" mechanisms; in this case the hinge line is preferably perpendicular to the shutter panel, i.e. mainly parallel to the inboard-outboard direction, with some benefits for manufacturing the parts.

This principle can also be designed with two shutter panels and two hinge lines or one common hinge line, the shutter panels being driven by two drive struts or one drive strut and one coupling link (or gear) between the shutter panels to create a scissor-like opening movement.

The "planar" shutter panel mechanism with one hinge line, one panel, and a strut is a simple solution and leaves more usable space, since the entire mechanism moves essentially in only two dimensions.

In a variant of the "planar" shutter panel mechanism there are two hinge lines, two panels, and two compression loaded springs. With this concept no interface, such as a drive strut, is needed on the trunnion. The actuation of the panels may be directly performed with the trunnion-tube. In order to reduce the friction on the contact surface between the panels and the trunnion a suitable coating or lining, such as PTFE is preferred.

There is also the possibility to form a "spatial" shutter panel mechanism with one hinge line and a driving-strut. In difference to the "planar" shutter panel mechanism is that, the hinge line is orientated in a spatial manner, for example mainly parallel to the forward-aft direction and inclined with respect to the horizontal direction, and also the drive-strut. So the "spatial" shutter panel usually folds up in the upper or lower direction. In terms of space allocation this may be beneficial, if the surrounding belly fairing structure frames are limiting the necessary design space. Also, the "spatial" shutter panel mechanism can be designed with two hinge lines and two panels on each side of the trunnion cut-out.

The sealing concept described herein is able to improve operational issues such as:
- stiffness issues, flow leakages, and all kind of wear (erosion, abrasive wear, fissures (cracks), etc. . . . ) may be reduced;
- soft and hard jams, caused by dirt, dust, and ice accumulation can be mitigated;
- mechanical wear on the trunnion can be ameliorated due to the improved actuation, preferably using a separate drive member.

BRIEF DESCRIPTION OF THE DRAWINGS

Embodiments of the disclosure herein are described with reference to the accompanying schematic drawings.

DETAILED DESCRIPTION

Figure 1:
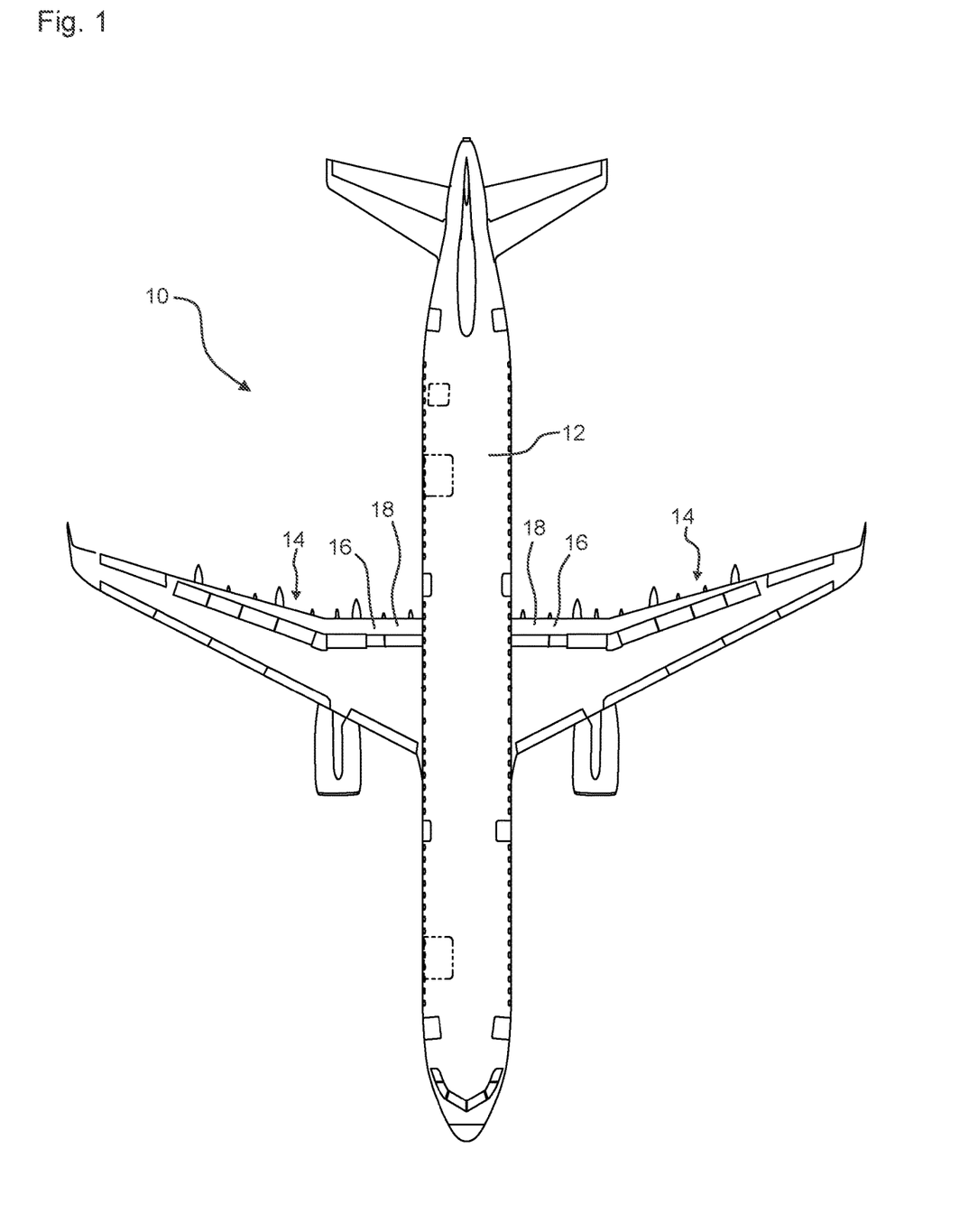
FIG. 1 depicts an embodiment of an aircraft.

FIG. 1 depicts an aircraft 10 having a fuselage 12 and a pair of wings 14 attached to the fuselage 12.

The aircraft 10 is equipped with a high-lift system 16, which in a manner known per se comprises a high-lift device 18, such as a trailing edge flap.

Figure 2:
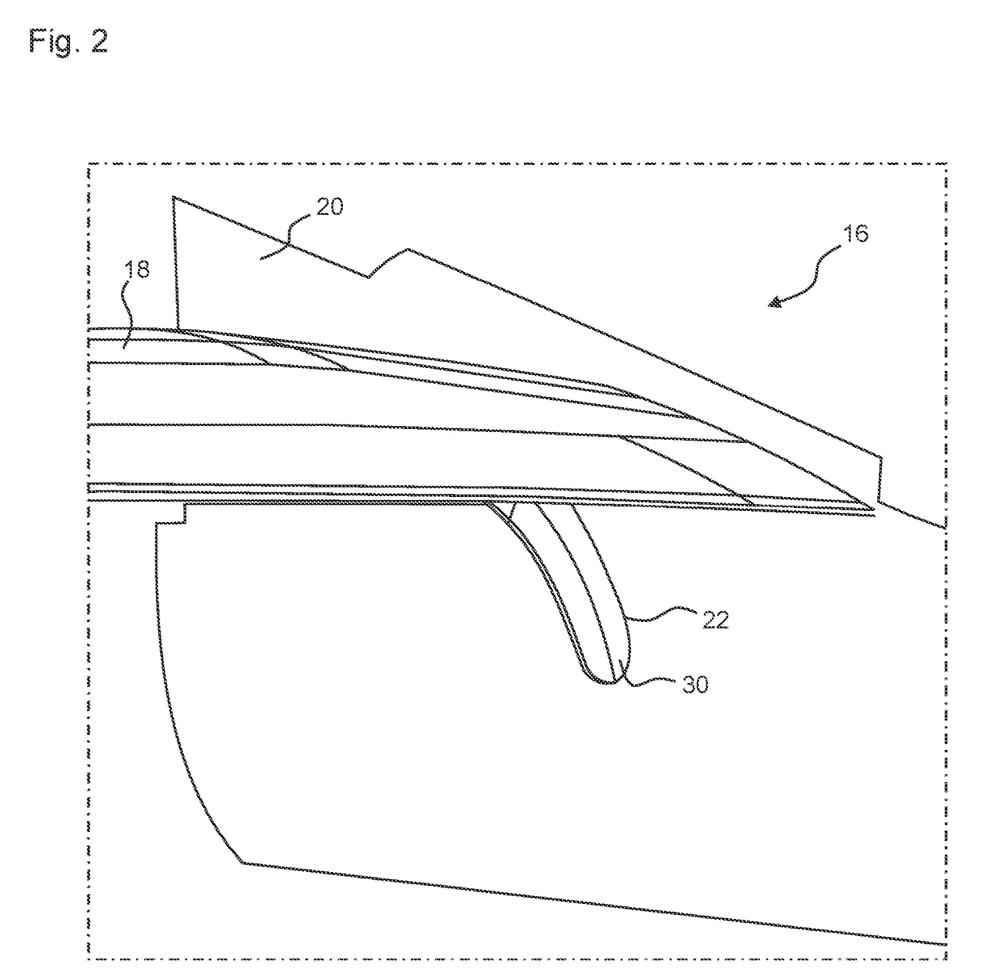
FIG. 2 depicts an embodiment of a high-lift system.

Referring to FIG. 2, the wing 14, more precisely the high-lift system 16, is depicted in more detail in the vicinity of a belly fairing 20 of the fuselage 12.

The belly fairing 20 includes a trunnion opening 22. The trunnion opening 22 extends in a longitudinal direction. Furthermore, the trunnion opening 22 follows a substantially angular path.

Figure 3:
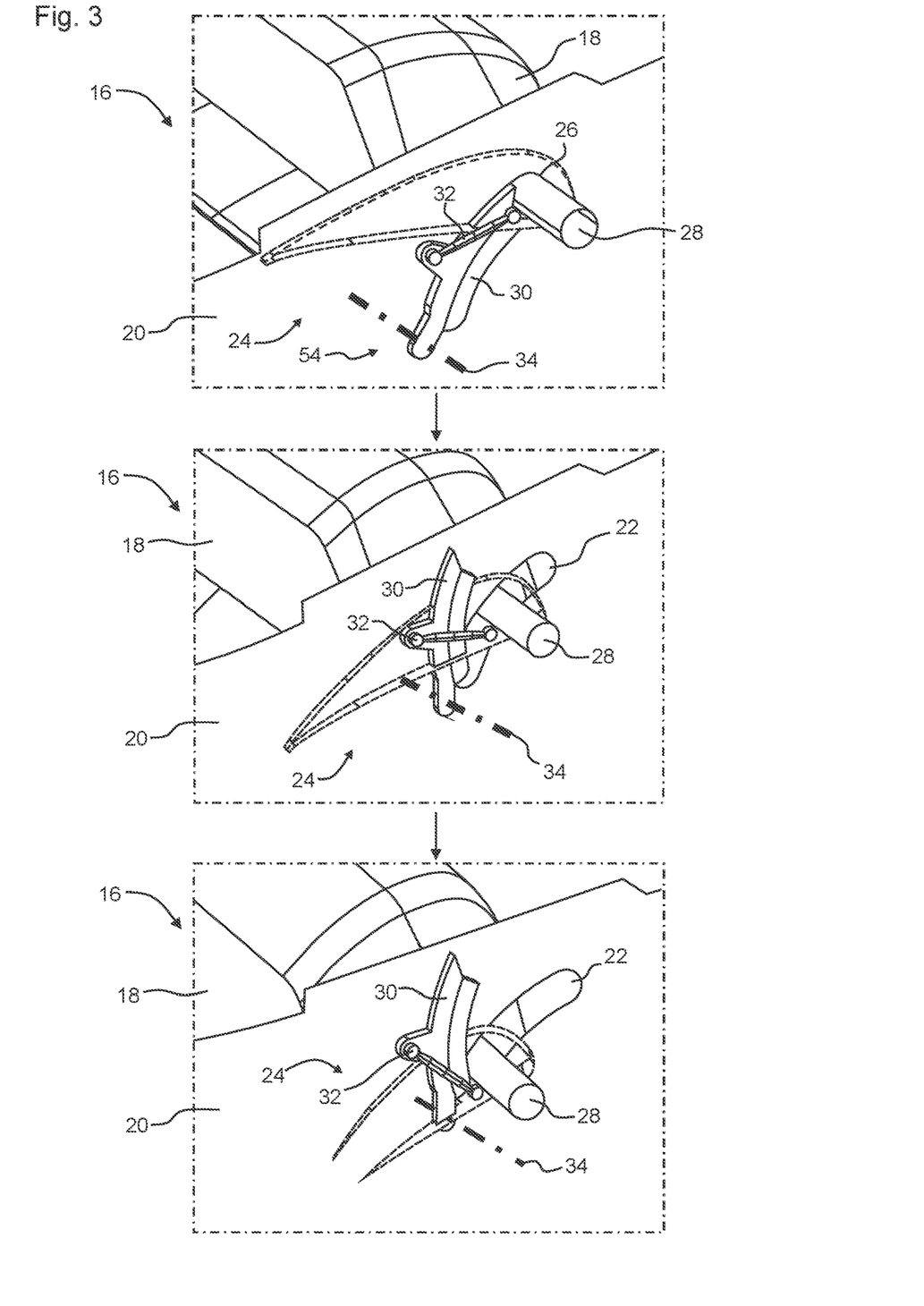
FIG. 3 depicts the high-lift system from FIG. 2 with a shutter arrangement in the fully shut, intermediate, and fully open positions.

Further referring to FIG. 3, the high-lift system 16 further comprises a shutter arrangement 24. The shutter arrangement 24 is preferably arranged on the inboard side of the belly fairing 20. The shutter arrangement 24 is configured to cover the trunnion opening 22 except for a trunnion passage 26, except when the shutter arrangement 24 is in the fully closed position (FIG. 3, bottom). The trunnion passage 26 allows for a trunnion shaft 28 to pass through. The trunnion shaft 28 is coupled to the high-lift device 18 to move the high-lift device 18 between a retracted position and an extended position. In moving from the retracted to the extended position, the trunnion shaft 28 moves along the longitudinal direction of the trunnion opening 22.

The shutter arrangement 24 comprises a shutter panel 30 which is formed in a shape corresponding to the shape of the trunnion opening 22, to cover the trunnion opening 22 except for the trunnion passage 26.

The shutter panel 30 is preferably formed as a planar member. The shutter panel 30 may be made of metal, composite material or high-performance plastics which is typically used in aircraft manufacturing.

The shutter arrangement 24 further comprises a driving member 32. The driving member 32 is mechanically coupled to the trunnion shaft 28 or another part of the high-lift system 16 which moves, when the high-lift device 18 is extended or retracted. Furthermore, the driving member 32 is mechanically coupled to the shutter panel 30. The driving member 32 is preferably formed as a single unitary member. The driving member 32 may be in the shape of a driving strut.

The shutter panel 30 is mounted to the aircraft 10 in a rotatable manner. The shutter panel 30 thereby rotates about a hinge axis 34. The hinge axis 34 is preferably parallel to the inboard-outboard direction or perpendicular to the trunnion opening 22.

In the fully shut position, the shutter panel 30 covers the trunnion opening 22 and engages the trunnion shaft 28, to cooperate to cover the trunnion opening 22, thereby allowing for better airflow in cruise flight.

When the high-lift device 18 is extended, since the shutter panel 30 is mechanically coupled to the trunnion shaft 28, for example, by the driving member 32, the shutter panel 30 rotates about the hinge axis 34. However, in contrast to other systems, the rotation of the shutter panel 30 is kinetically linked to the movement of the high-lift device 18, so that as a result the shutter panel 30 is moved in correspondence to the movement of the high-lift device 18 in a continuous and strictly monotone manner. In other words, when the high-lift device 18 is extending or retracting then the shutter panel 30 is opening or shutting, respectively.

Further embodiments of the disclosure herein will subsequently only be described in so far as they differ from the previous embodiment.

Figure 4:
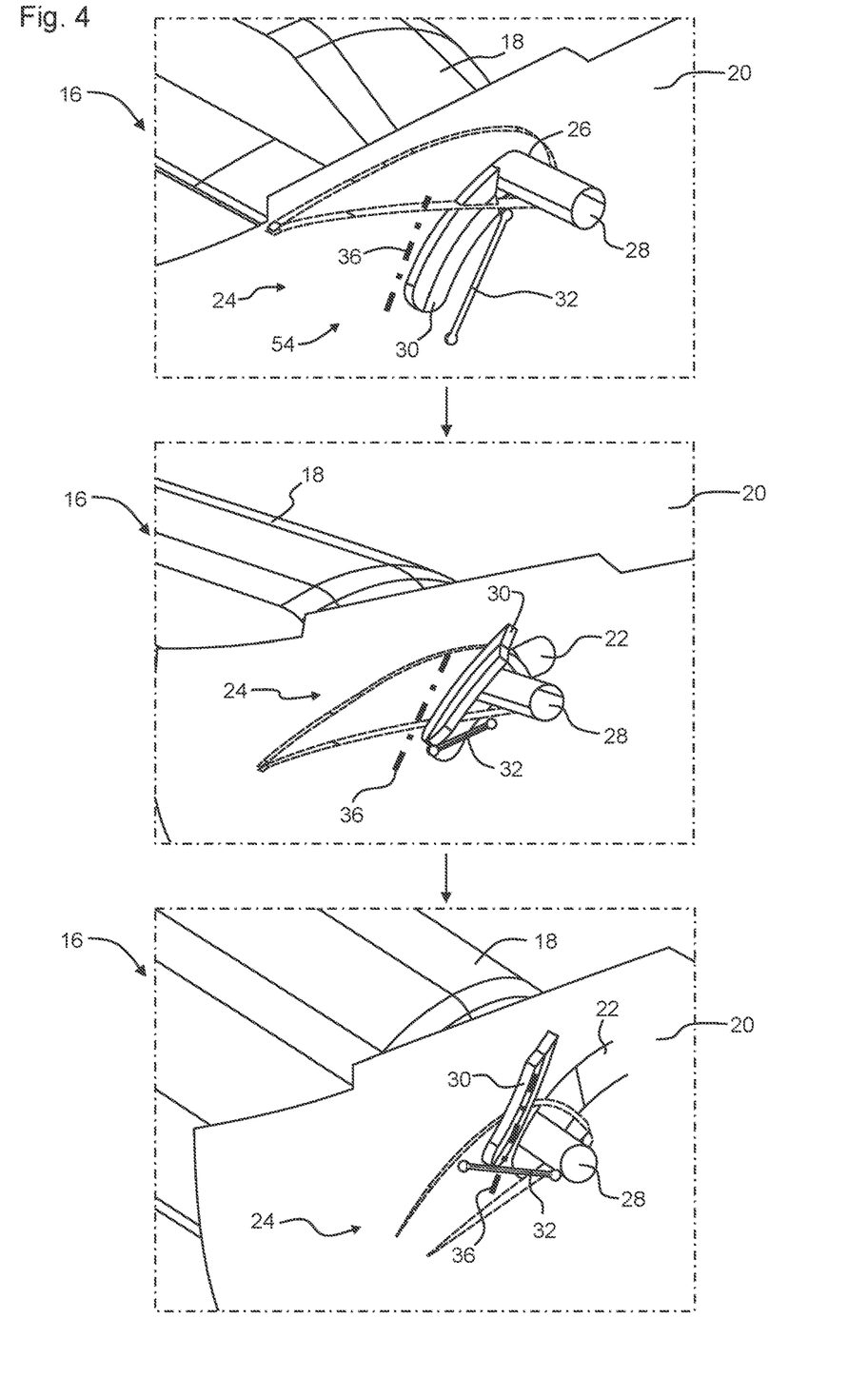
FIG. 4 depicts another embodiment of a high-lift system with a shutter arrangement in the fully shut, intermediate, and fully open positions.

Referring to FIG. 4, the main difference is that the shutter panel 30 now comprises a hinge axis 36, which is substantially parallel to the forward aft direction of the aircraft or parallel to the trunnion opening 22. In a side view, the hinge axis 36 is inclined relative to the horizontal direction, preferably at an angle between 20 degrees and 90 degrees.

Thus, when the high-lift device 18 is extended, the shutter panel 30 uncovers the trunnion opening 22 in a manner similar to a swing door. In this configuration, the driving member 32 is configured such that after an initial movement of the trunnion shaft 28, the shutter panel 30 is moved so far that unhindered movement of the trunnion shaft 28 is possible within the trunnion opening 22. As depicted in FIG. 4, top, in the fully opened position, the shutter panel 30 has moved more than 90° about the hinge axis 36.

Figure 5:
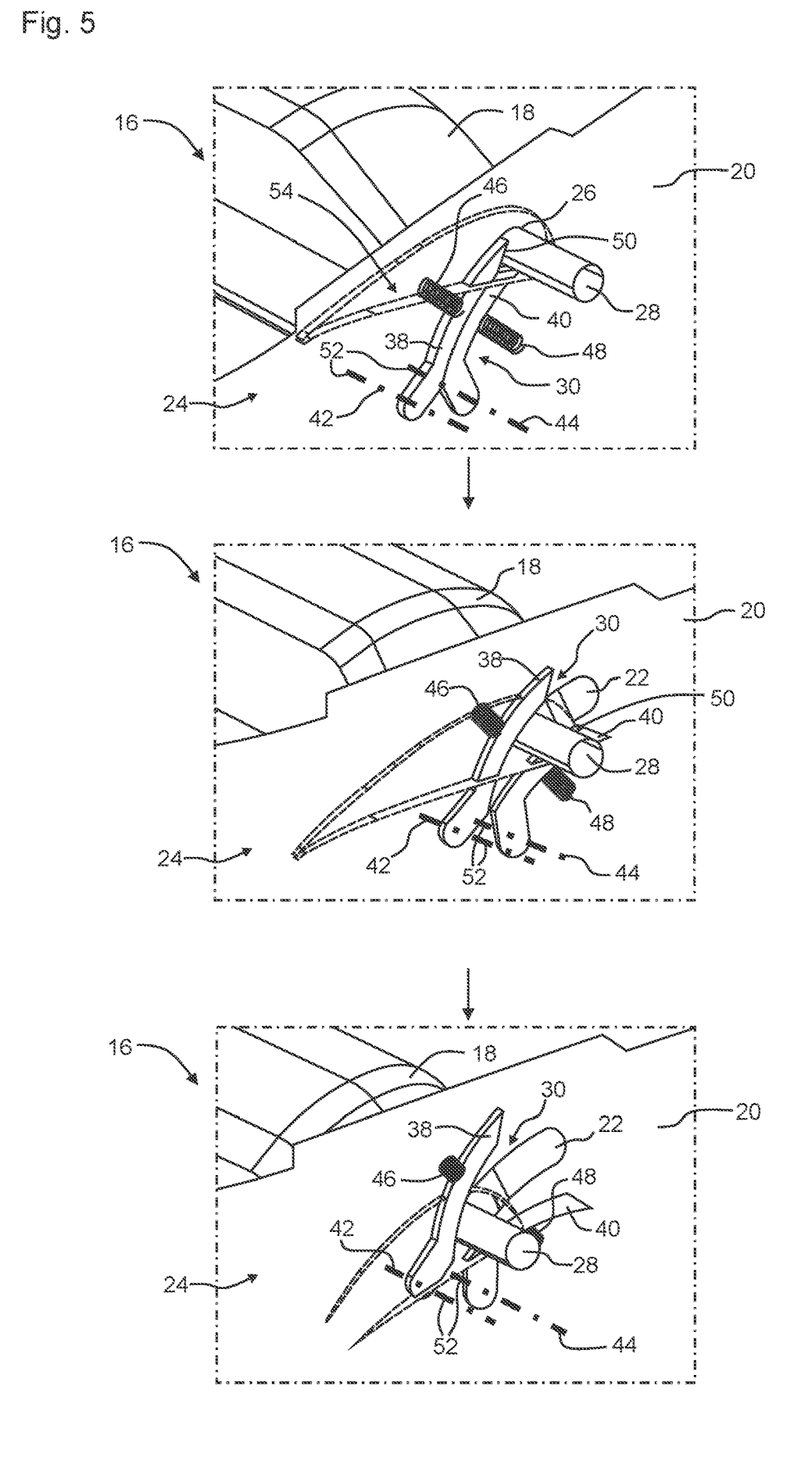
FIG. 5 depicts an embodiment of a high-lift system with a shutter arrangement in the fully shut, intermediate, and fully open positions.

Referring now to FIG. 5 the shutter panel comprises a first shutter 38 and a second shutter 40. The first shutter 38 is mounted rotatability about a first hinge axis 42 whereas the second shutter 40 is mounted rotatable about a second hinge axis 44. In contrast to the previous embodiments, in this configuration there is no driving member.

However, in this embodiment of the high-lift system 16, there is a first urging member 46 and a second urging member 48. The first and second urging members 46, 48 may be implemented using an elastic member, such as a spring. The first and second urging members 46, 48 are arranged so that the first and seconds 38, 40 are urged towards the fully shut position.

Again, in the fully shut position (FIG. 5, top) each of the first and second shutters 38, 40 may engage the trunnion shaft 28.

Each shutter 38, 40 comprises a cam 50 which is arranged to engage with the trunnion shaft 28, when the trunnion shaft 28 is moving.

When the high-lift device 18 is extending, at some point early in the movement, the trunnion shaft 28 engages the cam 50. Thereby, the first and second shutters 38, 40 are moved against the urging force created by the first and second urging member 46, 48 and rotated about their respective hinge axes 52. The hinge axis 52 is similar to the hinge axis 34 in the respect that it is substantially parallel to the inboard-outboard direction or perpendicular to the trunnion opening 22. As a result, the trunnion shaft 28 splits the shutter panel 30 in the longitudinal direction. The further the trunnion shaft 28 moves towards the fully extended position, the further the shutter panel 30 comes to the fully opened position.

When the high-lift device 18 is again retracted, the first and second urging member 46, 48 cause the first and second shutter 38 and 40 to move towards the fully shut position.

In order to improve sealing at the transition between high-lift devices and fairings, the disclosure herein suggests a shutter assembly 54 which may be installed in a high-lift system 16, thereby forming the shutter arrangement 24. The shutter assembly 54 comprises the shutter panel 30 and possibly the driving member 32. The shutter assembly 54 can be installed in the high-lift system 16, to form any embodiment of the shutter arrangement 24. The shutter arrangement 24 covers the trunnion opening 22 and is moveable in correspondence with the movement of the high-lift device 18 in a continuous and strictly monotone manner.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 high-lift system
18 high-lift device
20 belly fairing
22 trunnion opening
24 shutter arrangement
26 trunnion passage 28 trunnion shaft
30 shutter panel
32 driving member
34 hinge axis
36 hinge axis
38 first shutter
40 second shutter
42 first hinge axis
44 second hinge axis
46 first urging member
48 second urging member
50 cam
52 hinge axis
54 shutter assembly

The invention claimed is:

1. A shutter assembly configured to form a shutter arrangement for covering a trunnion opening in a belly fairing of an aircraft, wherein the trunnion opening extends along a longitudinal direction and follows an annular path, wherein the trunnion opening is configured for letting a trunnion shaft of a high-lift device pass through, the shutter assembly being configured to be installed adjacent to the trunnion opening, to be rotatable between a fully shut position, in which the shutter assembly covers the trunnion opening except for a trunnion passage at one end portion of the trunnion opening for the trunnion shaft to pass through, and a fully open position, wherein the shutter assembly is configured to be installed such that the shutter assembly is movable between the fully shut and fully open positions in a continuous and/or strictly monotonous manner in correspondence with movement of the trunnion shaft within the trunnion opening.

2. The shutter assembly according to claim 1, further comprising a shutter panel adapted to a contour and extension of the trunnion opening such that, when the shutter assembly is in the fully shut position, the shutter panel covers the trunnion opening along its longitudinal direction except for the trunnion passage.

3. The shutter assembly according to claim 2, wherein the shutter panel is configured to be installed such that the shutter panel is rotatable about a hinge axis, which is mainly parallel to an inboard-outboard direction of the aircraft.

4. The shutter assembly according to claim 2, wherein the shutter panel is configured to be installed such that the shutter panel is rotatable about a hinge axis, which is mainly parallel to a forward-aft direction of the aircraft and which is inclined from a horizontal direction by an angle.

5. The shutter assembly according to claim 2, further comprising a drive member configured to be installed such that the drive member is mechanically coupled to the high-lift device to transmit movement of the high-lift device to the shutter panel thereby causing a continuous strictly monotone rotation of the shutter panel.

6. The shutter assembly according to claim 2, wherein the shutter panel comprises a first shutter and a second shutter that are both configured to be installed such that a movement of the trunnion shaft is able to split the shutter panel along its longitudinal direction and causing the first and second shutters to rotate about respective hinge axes to expose the trunnion opening in correspondence with the movement of the trunnion shaft within the trunnion opening.

7. The shutter assembly according to claim 1, further comprising an urging member configured to be installed such that the shutter assembly is urged towards the fully shut position.

8. A shutter arrangement for covering a trunnion opening in a belly fairing of an aircraft, the shutter arrangement comprising a portion of a belly fairing, a trunnion opening formed in the belly fairing, the trunnion opening extending along a longitudinal direction and following an annular path, wherein the trunnion opening is configured for letting a trunnion shaft of a high-lift device pass through, and a shutter assembly according to claim 1, the shutter assembly being adjacent to the trunnion opening, to be rotatable between a fully shut position, in which the shutter assembly covers the trunnion opening except for a trunnion passage arranged at one end portion of the trunnion opening for the trunnion shaft to pass through, and a fully open position, wherein the shutter assembly is configured such that the shutter assembly is movable between the fully shut and fully open positions in a continuous and/or strictly monotonous manner in correspondence with the movement of the trunnion shaft within the trunnion opening.

9. The shutter arrangement according to claim 8, wherein the shutter assembly comprises a shutter panel adapted to a contour and extension of the trunnion opening such that, when the shutter assembly is in the fully shut position, the shutter panel covers the trunnion opening along its longitudinal direction except for the trunnion passage.

10. The shutter arrangement according to claim 9, wherein the shutter panel is mounted to be rotatable about a hinge axis, which is mainly parallel to an inboard-outboard direction of the aircraft.

11. The shutter arrangement according to claim 9, wherein the shutter panel is mounted to be rotatable about a hinge axis, which is mainly parallel to a forward-aft direction of the aircraft and which is inclined from the horizontal direction by an angle.

12. The shutter arrangement according to claim 9, wherein the shutter assembly comprises a drive member that is configured to be mechanically coupled to the high-lift device and that is mechanically coupled to the shutter panel, to transmit movement of the high-lift device to the shutter panel thereby causing a continuous strictly monotone rotation of the shutter panel.

13. The shutter assembly according to claim 9, wherein the shutter panel comprises of a first shutter and a second shutter that are both mounted relative to the trunnion opening such that a movement of the trunnion shaft is able to split the shutter panel along its longitudinal direction and causing the first and second shutters to rotate about respective hinge axes to expose the trunnion opening in correspondence with the movement of the trunnion shaft within the trunnion opening.

14. A high-lift system for an aircraft, the high-lift system comprising a high-lift device that is movable by a trunnion shaft between a retracted position and an extended position, in which additional lift is created, and a shutter arrangement according to claim 8, wherein the trunnion shaft extends through a trunnion opening formed in the belly fairing.

15. An aircraft comprising a high-lift system according to claim 14.

16. An aircraft comprising a shutter arrangement according to claim 8.

17. An aircraft comprising an installed shutter assembly according to claim 1.

* * * * *